United States Patent [19]

Chaplin

[11] Patent Number: 5,313,304
[45] Date of Patent: May 17, 1994

[54] CHROMA KEYER WITH FRINGE CONTROL OFFSET

[75] Inventor: Daniel J. Chaplin, Nevada City, Calif.

[73] Assignee: The Grass Valley, Group, Inc., Nevada City, Calif.

[21] Appl. No.: 80,162

[22] Filed: Jun. 21, 1993

[51] Int. Cl.⁵ ............................................. H04N 9/75
[52] U.S. Cl. .................................... 348/587; 348/590
[58] Field of Search ............. 358/22, 183; H04N 9/75

[56] References Cited

U.S. PATENT DOCUMENTS

| | | | |
|---|---|---|---|
| 4,409,611 | 10/1983 | Vlahos | 358/22 |
| 5,032,901 | 7/1991 | Vlahos | 358/22 |
| 5,251,016 | 10/1993 | Delwiche | 358/22 |

Primary Examiner—James J. Groody
Assistant Examiner—Cheryl Cohen
Attorney, Agent, or Firm—Francis I. Gray

[57] ABSTRACT

A chroma keyer with fringe control offset adds a fringe control offset value to a correlation output produced by a hue selector. The hue selector compares the hues of a foreground image, representing a foreground object in front of a reference matte background, with a reference hue corresponding to the reference matte background to produce the correlation output. The adjusted correlation signal is then negatively clipped and provided at the output of the hue selector as a hue select signal that is used for deriving a chroma key signal and for providing background suppression to the foreground image.

4 Claims, 2 Drawing Sheets

CHROMA KEYER WITH FRINGE CONTROL OFFSET

BACKGROUND OF THE INVENTION

The present invention relates to compositing of video images, and more particularly to a chroma keyer with fringe control offset which generates a hue select signal that responds to areas of a foreground object where there is mixing of a background hue with the foreground object within a foreground image.

In television it is often desirable to superimpose a foreground object, such as a weather man, in front of a background image, such as a weather map. The foreground object is placed in front of a reference background of a specified hue, usually blue, to form a foreground image. The foreground image is input to a chroma keyer to generate a key signal that cuts a hole in the background image to form a shaped background image while suppressing the reference background from the foreground image to isolate the foreground object as a shaped foreground image. The shaped foreground image is then composited with the shaped background image to produce the illusion of the foreground object appearing in front of the background image.

Traditional implementations of chroma keying circuits have not always been able to produce results that are free from unwanted artifacts. One such artifact is caused by the mixing of the hue in the reference background with the hues of the foreground object, particularly around the fringes of the foreground object. For example a blue reference background may be reflected from or transmitted through part of the foreground object such that the color of the foreground object, especially at the edges, is changed or removed. As seen by a video camera brown hair may become mixed with the blue background so that the hair is not brown enough, or due to vector color addition is grey, i.e., has luminance values only. This mixing seems normal when the foreground object is in front of the reference background, but when a new background image replaces the reference background a grey halo may appear around the foreground object, giving an unnatural appearance.

There are ways to correct the hue of the foreground object to remove the hue of the reference background from the foreground object. One method is to remove some "blue", i.e., the hue of the reference background, from everywhere in the foreground object. However uniform removal of "blue" from the foreground object does not work well since the mixing of the hue from the reference background with the hues of the foreground object is not uniform, but occurs especially at the edges and in transparent parts of the foreground object. Another method is to remove "blue" from one specific mix of colors. However this method is limited by being able to correct only one mix of colors, and cannot correct a mix that produces no color at all.

A typical chroma keyer circuit is implemented in the Model 3000 Production Switcher, manufactured by The Grass Valley Group, Inc. of Grass Valley, California, United States of America and described in U.S. Pat. No. 5,251,016 issued Oct. 5, 1993 to James A. Delwiche entitled "Chroma Keyer with Secondary Hue Selector." A hue selector, shown in detail in FIG. 4 of the Delwiche application, compares the hues of the foreground image, having the foreground object in front of the reference background, with the hue of the reference background to generate a hue select signal. The hue select signal, as shown in FIG. 1 of the Delwiche application, is input to a key circuit to generate the chroma key signal. The hue select signal also is used to shape a color matte signal from a color matte generator via a multiplier in such a way that, when subtracted from the foreground image, it produces a shaped foreground image having black in place of the reference background. The shaped foreground image is then composited with the background image, as shaped by the chroma key signal, to produce the composited image. A negative clipper at the output of the hue selector assures that the hue select signal only has positive values.

Regions of the foreground image where the colors mix to form grey appear as a zero level in the hue select signal. Colors of other hues which do not correlate with the hue of the reference background, according to the selectivity of the hue selector, and produce negative values are clipped at zero. Colors having hues correlated with the hue of the reference background produce positive values as the hue select signal.

What is desired is a chroma keyer that corrects color mixing between the reference background and the foreground object, especially when the color mixing produces a region of the foreground object having luminance values only.

SUMMARY OF THE INVENTION

Accordingly the present invention provides a chroma keyer with fringe control offset for correcting color mixing in a foreground image between the hue of a reference background and the hues of a foreground object. In a hue selector, which compares the hues of the foreground image with the hue of the reference background, a fringe control offset value is added to the hue select signal before a negative clipper so that regions of the foreground object where color mixing occurs are correlated with the hue of the reference background. The fringe corrected hue select signal is then input to a keying circuit to produce a chroma key signal and is input to a background suppression circuit to produce a shaped foreground image.

The objects, advantages and other novel features of the present invention are apparent from the following detailed description when read in conjunction with the appended claims and attached drawing.

DESCRIPTION OF THE PREFERRED EMBODIMENT

Figure 1:
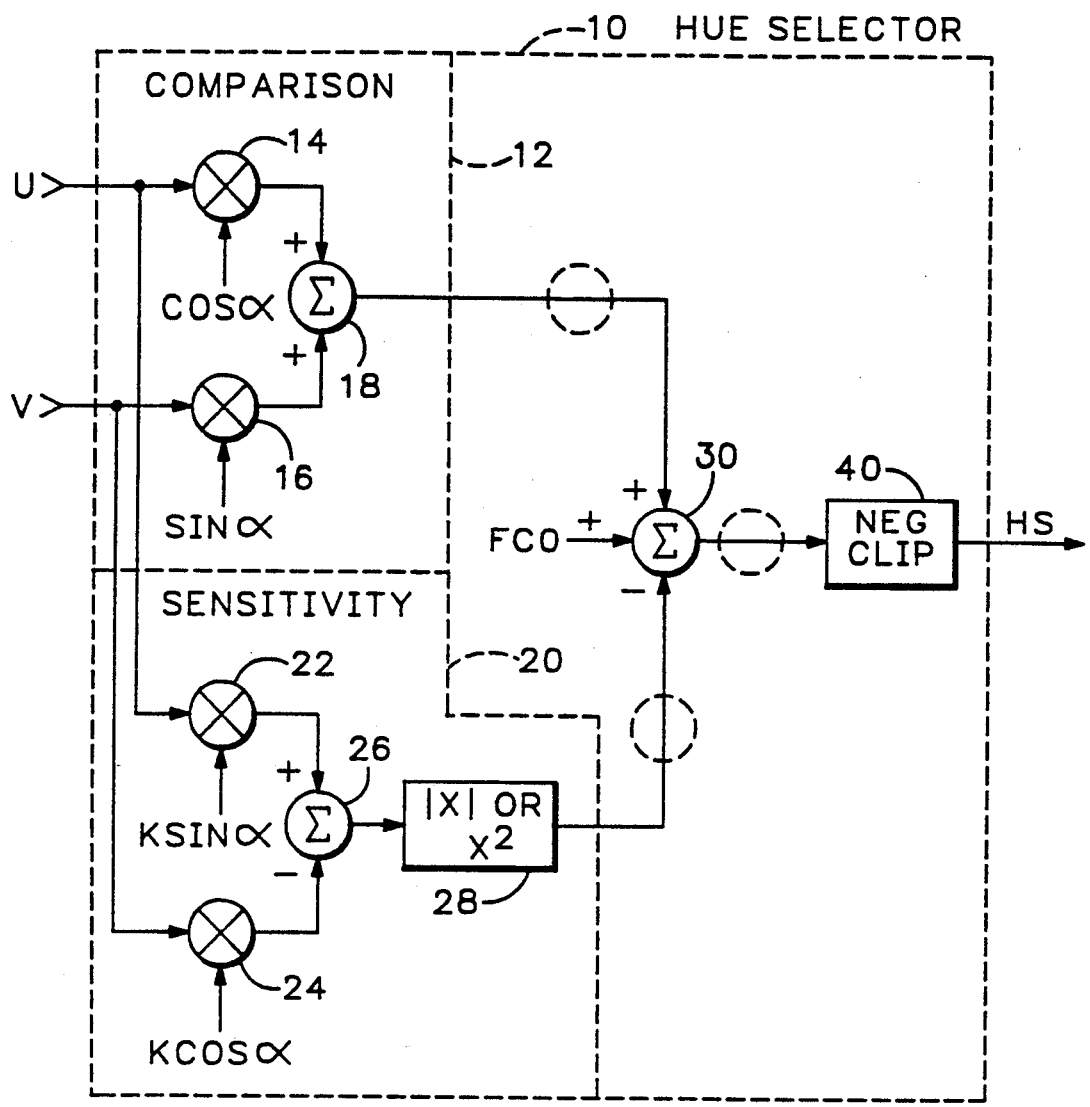
FIG. 1 is a block diagrammatic view of a hue selector for a chroma keyer according to the present invention.

Referring now to FIG. 1 a hue selector 10 receives component chrominance values U, V as inputs and provides a hue select signal HS as an output. The component chrominance values U, V represent the color components of a foreground image having a reference background of a predetermined reference hue and a foreground object in front of the reference background. The component chrominance values U,V are input to a comparison circuit 12 which produces a correlation output equivalent to chrominance times the cosine of the difference in hue between the reference background and the hues of the foreground image. A first multiplier 14 multiplies the U chrominance value with the cosine of the reference hue, where hue is expressed as an angular quantity as is well known in the art. A second multiplier 16 multiplies the quadrature V chrominance value with the sine of the reference hue. The outputs from the multipliers 14, 16 are input to a first adder 18 to produce the correlation output. The correlation output is maximum where the hues of the foreground image closely match the reference hue, and is minimum when the hues are dissimilar.

An optional sensitivity circuit 20 also has the component chrominance values U, V as inputs and provides a sensitivity output. A third multiplier 22 multiplies the U chrominance value with the product of a sensitivity factor K and the sine of the reference hue, while a third multiplier 24 multiplies the V chrominance value with the product of the sensitivity factor K and the cosine of the reference hue. The outputs of these multipliers 22, 24 are input to a subtractor 26, and the result is input to an absolute value or squaring circuit 28 to provide the sensitivity output. The sensitivity output is subtracted from the correlation output in a summation circuit 30 to adjust the continuous variation of the correlation output as the difference in hue changes to a range of less than 180 degrees. The output of the summation circuit 30 is an adjusted correlation output. The adjusted correlation output is input to a negative clip circuit 40 to provide the hue select signal from which a chroma key signal is derived. The hue select signal also is used to suppress the reference hue in the foreground image to produce a shaped foreground image.

Figure 2:
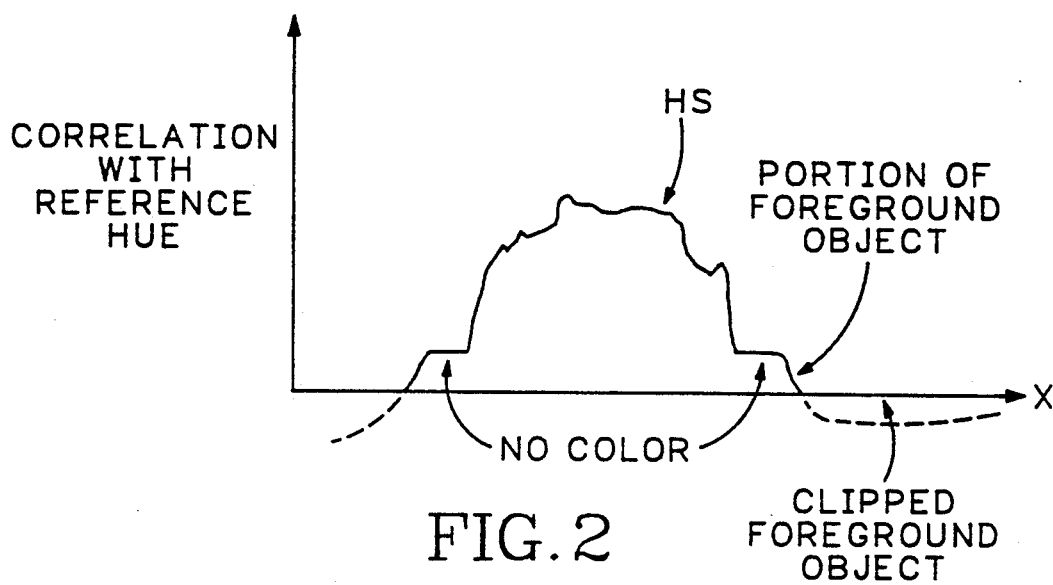
FIG. 2 is a graphic view of a hue select signal from a chroma keyer according to the present invention.

At some point prior to the negative clip circuit 40 a fringe control offset FCO value is added to the correlation output. This FCO value may be added into the summation circuit 30, or may be added at either the output of the comparison circuit 12 directly to the correlation output or at the output of the summation circuit 30 directly to the adjusted correlation output. Likewise the FCO value may be subtracted at the output of the sensitivity circuit 20 directly from the sensitivity output. The result is to pull the hues of the foreground object toward the reference hue so that regions of the foreground object that are colorless due to the mixing of the reference background hue with the hues of the foreground object at the fringes are included in the hue select signal HS, as is shown in FIG. 2. Thus the range of hues included within the hue select signal HS is expanded to include more areas of the foreground object where the hue may have been mixed and/or no color exists.

Figure 3:
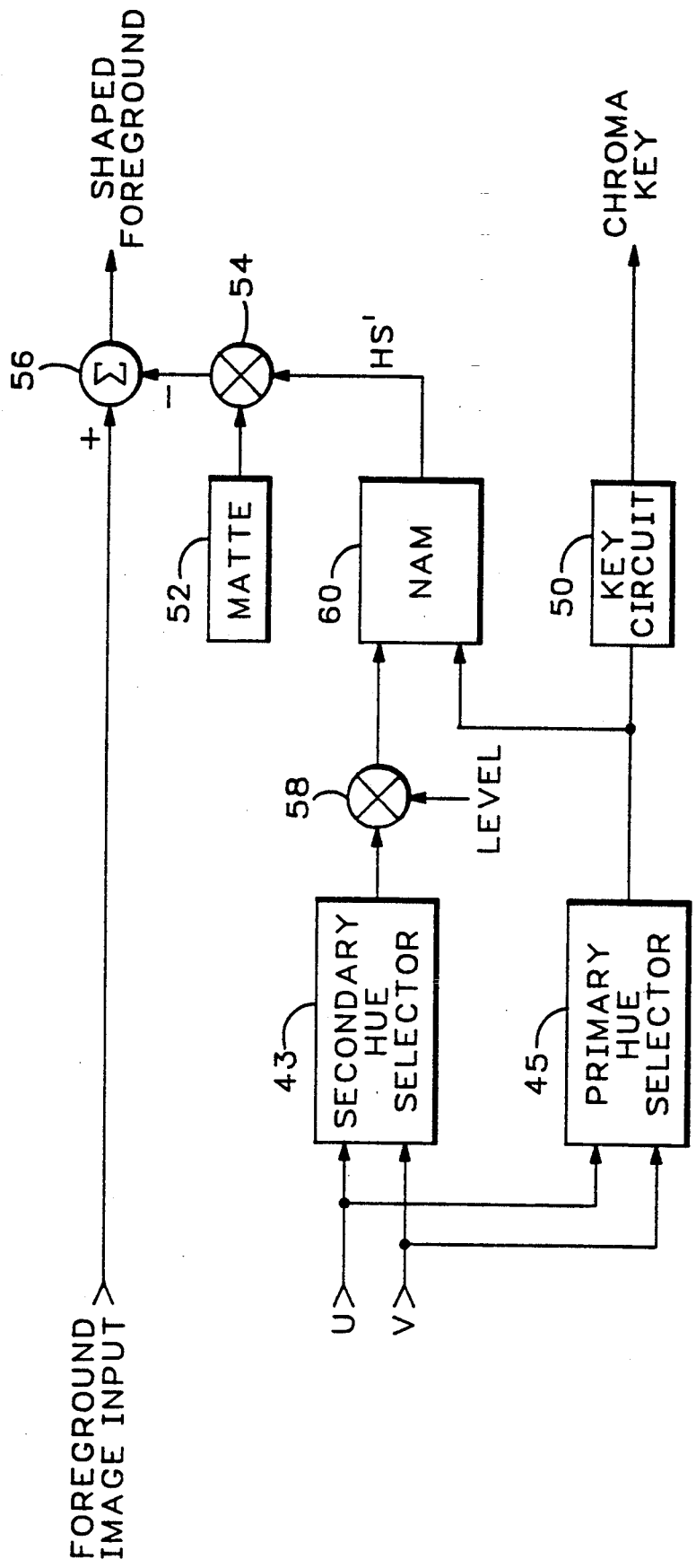
FIG. 3 is a block diagrammatic view of a chroma keyer according to the present invention using secondary hue suppression.

The hue select signal is input to a key circuit 50 to generate a chroma key signal, as shown in FIG. 3 and described above, for cutting a hole in a new background image where the foreground image will be. The hue select signal also is used to shape a color matte signal from a matte generator 52 via a multiplier 54 in such a way that, when subtracted by a second subtractor 56 from the foreground image, the reference background becomes black to produce the shaped foreground object for compositing with the new background image. A further improvement is provided by using a secondary hue selector 43 together with a primary hue selector 45, both having as inputs the U, V chrominance values. However the reference hue for the secondary hue selector 43 may be adjusted to a particular color mix value, as is described in the aforementioned Delwiche application, rather than to the hue of the reference background. The secondary hue select signal is adjusted by a level multiplier 58 and input to a nonadditive mix circuit 60. Also input to the non-additive mix circuit 60 is the primary hue select signal to produce a composite hue select signal HS' for use in the background suppression process. The secondary hue selector 43 has the configuration as shown in FIG. 1, while the primary hue selector 45 corresponds to those described in the prior art without fringe control offset. The hues of the foreground object may be separately controlled from the hue of the reference background, and the FCO value in the second hue selector 10' may be used to affect the foreground object only. Using only the primary hue selector 45 with fringe control offset, changing the FCO value affects the suppression of the foreground object and the generation of the chroma key signal. However using the secondary hue selector 43 with fringe control offset while using the primary hue selector 45 without fringe control offset allows changing the FCO value to affect the foreground object only. Thus the two hue selectors 43, 45 control different parts of the foreground image independently. The level multiplier 58 allows the amount of suppression applied to the foreground object to be adjusted. The primary hue selector 45 is used to generate the chroma key signal, so the hole is cut in the new background based only on where the reference background in the foreground image is.

Thus the present invention provides a chroma keyer with fringe control offset that reduces artifacts due to mixing between the hues of a reference background and a foreground object in a foreground image by adding a fringe control offset value to a correlation output generated by a hue selector prior to an output negative clipper so that the mixed colors, or non-colors, are included in a hue select signal output from the hue selector for chroma key generation and background suppression.

What is claimed is:

1. An improved chroma keyer of the type having a hue selector for generating a hue select signal that represents the correlation between the hues of an input foreground image, the input foreground image representing a foreground object in front of a reference background, and a reference hue corresponding to the hue of the reference background, the hue selector having means for comparing the input foreground image with the reference hue signal to produce a correlation output and having means for clipping the negative values of the correlation output to produce the hue select signal, wherein the improvement comprises means for adding a fringe offset value to the correlation output prior to the clipping means so that the hue select signal includes portions of the foreground object that are mixed with the hue of the reference background.

2. An improved chroma keyer of the type having a primary hue selector for producing from the comparison of an input foreground image and a first hue corresponding to a reference background of the input foreground image a primary hue select signal from which a chroma key signal is derived, a secondary hue selector for producing from the comparison of the input foreground image and a second hue corresponding to a mixed color of a foreground object of the input foreground image a secondary hue select signal separate from the primary hue select signal, and means for combining the primary and secondary hue select signal to produce a composite hue select signal for background suppression of the input foreground image by a color matte generator, wherein the improvement comprises means in the secondary hue selector for adding a fringe offset value to a correlation output obtained by the comparison of the input foreground image with the first hue prior to a negative clipping means from which the secondary hue select signal is obtained so that the secondary hue select signal includes portions of the foreground object that are mixed with the hue of the reference background.

3. The improved chroma keyer of claim 2 further comprising means for multiplying the secondary hue select signal by a level value prior to the combining means to adjust the amount of background suppression in the foreground object.

4. An improved method of chroma keying of the type having the steps of generating via a hue selector a hue select signal that represents the correlation between the hues of an input foreground image, the input foreground image representing a foreground object in front of a reference background, and a reference hue corresponding to the hue of the reference background, the generating step including the steps of comparing the input foreground image with the reference hue signal to produce a correlation output and clipping the negative values of the correlation output to produce the hue select signal, wherein the improvement comprises the step of adding a fringe offset value to the correlation output prior to the clipping step so that the hue select signal includes portions of the foreground object that are mixed with the hue of the reference background.

* * * * *